US008219364B2

(12) United States Patent
Gupta et al.

(10) Patent No.: US 8,219,364 B2
(45) Date of Patent: Jul. 10, 2012

(54) METHOD TO IMPROVE UNFOLDING IN PETRI NETS

(75) Inventors: Lalit Gupta, Karnataka (IN); Karthik Ramchandran, Karnataka (IN); Mohammed Sardar, Karnataka (IN)

(73) Assignee: Agere Systems Inc., Allentown, PA (US)

( * ) Notice: Subject to any disclaimer, the term of this patent is extended or adjusted under 35 U.S.C. 154(b) by 1226 days.

(21) Appl. No.: 11/968,342

(22) Filed: Jan. 2, 2008

(65) Prior Publication Data

US 2009/0172013 A1    Jul. 2, 2009

(51) Int. Cl.
*G06F 7/60* (2006.01)
*G06F 17/10* (2006.01)

(52) U.S. Cl. .............................................. 703/2; 703/13
(58) Field of Classification Search .................. 703/2, 13
See application file for complete search history.

(56) References Cited

OTHER PUBLICATIONS

Semenov et al. "Verification of Asynchronous Circuits Using Time Petri Net Unfolding", 1996 ACM.*
Khomenko et al., "Towards an Efficient Algorithm for Unfolding Petri Nets" Department of Computing Science, University of Newcastle, Newcastle upon Tyne NE1 7Ru, U.K., pp. 1-15.
Mcmillan, "A Technique of State Space Search Baed on Unfolding", 1992 Kluwer Academic Publishers, Boston. (1992); pp. 1-24.
Hwang et al., "A Concurrency Characteristic in Petri Net Unfolding", 1997 IEEE, pp. 4266-4273.
Hickmott, et al., "Planning Via PetriNet Unfolding", IJCA107, pp. 1904-1911.
Heljanko, "Model Checking with Finite Complete Prefixes is PSPACE-complete", Helsinki University of Technology.

* cited by examiner

*Primary Examiner* — Saif Alhija
(74) *Attorney, Agent, or Firm* — Mendelsohn, Drucker & Associates, P.C.; Edward J. Meisarosh; Steve Mendelsohn

(57) ABSTRACT

Petri net models, of systems, communication protocols, and software programs, which include place objects, transition objects, arcs, and initial markings, may be used for testing and verification. To reduce computations, a new unfolding process is performed on the net models. Two or more candidate buffer place interfaces are selected from the input net model. The input net is subdivided with a preliminary cut to form two subnets, wherein the preliminary cut passes through suitable candidate buffer place interfaces, objects of each of the subnets other than the suitable candidate buffer place interfaces are reachable from at least one initial marking, and the subnets do not include a mix of initial and non-initial marking places. Each of the two subnets are unfolded and then joined to form an unfolded net that is behaviorally equivalent to original input net model. The unfolded net is then stored in a storage unit.

20 Claims, 13 Drawing Sheets

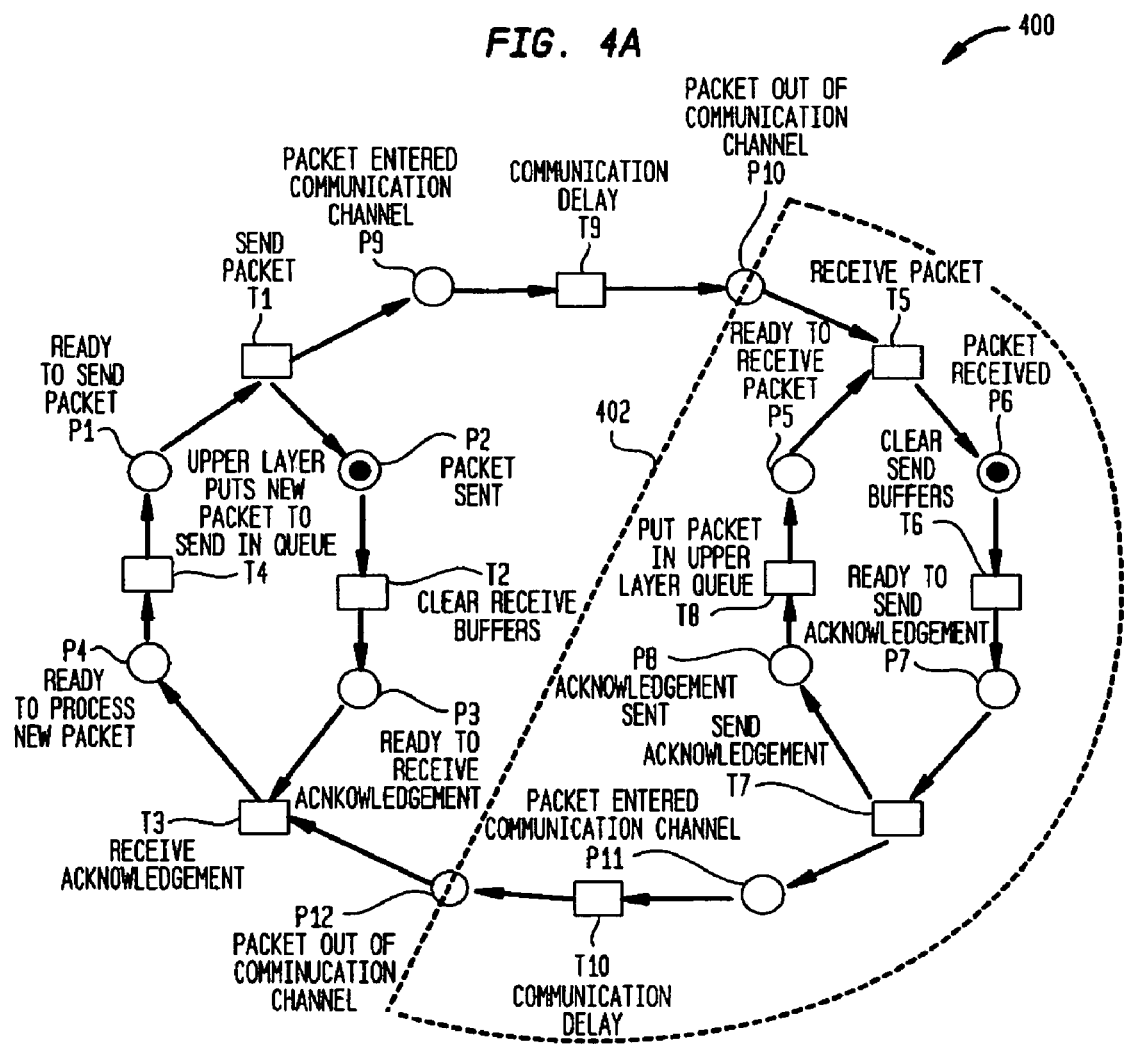

METHOD TO IMPROVE UNFOLDING IN PETRI NETS

FIELD OF INVENTION

The present invention relates generally to improved methods for unfolding Petri net models of programs and systems, and more particularly, to advantageous techniques for reducing computational requirements for unfolding a Petri net by subdividing the Petri net before unfolding and using a database of unfolded nets in unfolding the Petri net.

BACKGROUND OF INVENTION

Application of formal methods for testing a software program, a communication protocol, a processing system, and the like is a challenging task. Before formal methods can be applied, a high level model of the software program, protocol, or system is created using, for example, Petri net modeling techniques. A Petri net model is a graphical and mathematical model that may be used to represent many types of systems. By having a graphical and mathematical model of an embedded system software program, for example, various formal methods for testing of the modeled system may be used. For example, formal test specifications may be created based on the Petri net model and used to test the software program.

Once a high level Petri net model is created, it may be necessary to unfold it. Unfolding is a partial-order based method for the verification of concurrent systems, such as software or electronic systems. An unfolding process may cause a state space for a network to grow to an unmanageable size due to redundancy. Thus, the computational requirements of the unfolding process increase non-linearly with the increase in size of input net.

SUMMARY OF INVENTION

Among its several aspects, the present invention recognizes that to improve analysis, testing, and verification methods, it is desirable to more efficiently process net models, such as Petri net models, of systems, protocols, software programs, and the like, by reducing computational requirements of unfolding the Petri net models. To such ends, an embodiment of the present invention includes a method for unfolding on a processing system an input net model of a system, which includes place objects, transition objects, arcs between place objects and transition objects, and initial markings. Two or more candidate buffer place interfaces are selected from the input net model. The input net model is subdivided with a preliminary cut to form two subnets, wherein the preliminary cut passes through suitable candidate buffer place interfaces, objects of each of the subnets other than the suitable candidate buffer place interfaces are reachable from at least one initial marking, and the subnets do not include a mix of initial and non-initial marking places. Each of the two subnets are unfolded to form two unfolded subnets and the two unfolded subnets are joined to form an unfolded net that is behaviorally equivalent to the input net model. The unfolded net is stored in a storage unit of the processing system.

Another embodiment of the present invention addresses a computer readable medium storing computer programs which cause a computer system to perform unfolding an input net model of a system, which includes place objects, transition objects, arcs between place objects and transition objects, and initial markings. Two or more candidate buffer place interfaces are selected from the input net model. The input net model is subdivided with a preliminary cut to form two subnets, wherein the preliminary cut passes through suitable candidate buffer place interfaces, objects of each of the subnets other than the suitable candidate buffer place interfaces are reachable from at least one initial marking, and the subnets do not include a mix of initial and non-initial marking places. At least one unfolded subnet corresponding to one of the two subnets is fetched from a library database as a first unfolded subnet. The remaining subnet is unfolded to form a second unfolded subnet. The first unfolded subnet and the second unfolded subnet are joined to form an unfolded net that is behaviorally equivalent to the input net model. The unfolded net is stored in a storage unit of the processing system.

Another embodiment of the present invention addresses a method for unfolding on a processing system an input net model of a communication protocol, which includes place objects, transition objects, arcs between place objects and transition objects, and initial markings that are representative of the communication protocol. Two or more place objects are identified from the input net model with each identified place object being a buffer place interface. The input net model is subdivided with a preliminary cut to form two subnets, wherein the preliminary cut and the two subnets meet requirements that include the preliminary cut passes through suitable buffer place interfaces, objects of each of the subnets other than the suitable buffer place interfaces are reachable from at least one initial marking, and the subnets do not include a mix of initial and non-initial marking places. Each of the two subnets that meet the requirements is subdivided to form an additional two subnets. Each of the subnets formed by subdividing is unfolded to form a plurality of unfolded subnets and each of the unfolded subnets from the plurality of unfolded subnets are joined together to form an unfolded net that is behaviorally equivalent to the input net model. The unfolded net is stored in a storage unit of the processing system.

A more complete understanding of the present invention, as well as other features and advantages of the invention, will be apparent from the following detailed description and the accompanying drawings.

BRIEF DESCRIPTION OF DRAWINGS

FIG. 4A illustrates an exemplary input net model of a communication protocol before unfolding showing where a preliminary cut passing through preliminary buffer place interfaces may be made in accordance with an embodiment of the present invention;

DETAILED DESCRIPTION

The present invention will now be described more fully with reference to the accompanying drawings, in which several embodiments and various aspects of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Computer program code or software programs that are operated upon or which are utilized for carrying out operations according to the teachings of the invention may be written in a high level programming language such as C, C++, JAVA®, Smalltalk, JavaScript®, Visual Basic®, TSQL, Perl, or in various other programming languages. Software programs may also be written directly in a native assembler language for a target processor. A native assembler program uses instruction mnemonic representations of machine level binary instructions. Program code or computer readable medium as used herein refers to machine language code such as object code whose format is understandable by a processor.

Figure 1:
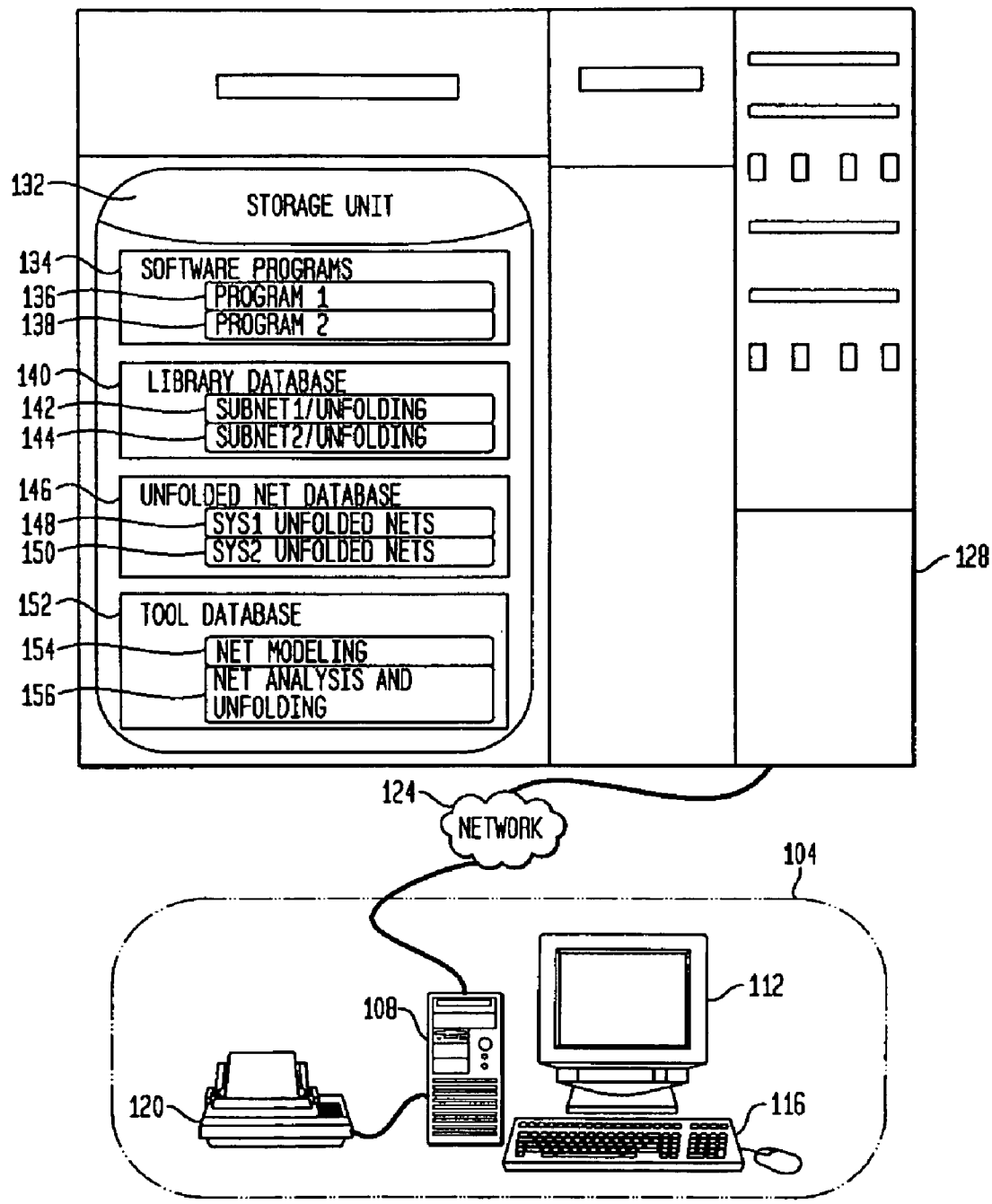
FIG. 1 illustrates an exemplary workstation system in accordance with an embodiment of the present invention.

FIG. 1 illustrates a programmed workstation system 100 in accordance with an embodiment of the present invention. The workstation system 100 may suitably include a work station 104 consisting, for example, of a processor complex 108, a monitor 112, a keyboard/mouse 116, a printer 120, and may include other input or output devices, such as an external file storage device. The work station 104 is connected to a network 124. This connection may be made utilizing the Internet or a local intra-net, for example. The network 124 is then further connected to a server 128 or a server farm, for example. The server 128 contains or is connected to a storage unit 132 having access to a software programs 134, a library database 140, an unfolded net database 146, and a tool database 152. The software programs 134 may contain programs such as program1 136 and program2 138 that are to be tested using formal methods in accordance with the present invention. Programs 136 and 138 are representative of software programs, communication protocols, processing systems and the like that are to be tested. The library database 140 contains various subnets such as subnet1 with an unfolded version of subnet1 (subnet1/unfolding) 142 and subnet2 with an unfolded version of subnet2 (subnet2/unfolding) 144. The unfolded net database 146 contains various unfolded versions of subnets corresponding to different systems, such as system 1 unfolded nets 148 and system 2 unfolded nets 150. The tool database 152 contains various tools, such as Petri net modeling tools 154 and Petri net unfolding tools 156 as described in further detail below.

To support testing and verification of a communication protocol, for example, an advantageous unfolding process in accordance with the present invention may suitably employ a number of Petri net tools, such as Petri net modeling tools 154 and Petri net unfolding tools 156. Such tools are described in further detail below and may be operative in the server 128 and may be controlled by the work station 104 or operative in the workstation 104. The Petri net tools, such as tools 154 and 156, may be stored as electronic media in the storage unit 132 on a high density disk drive, an optical disk drive, or the like. The Petri net tools, accessible from a computer-readable medium, may also be downloaded over a network 124, such as the Internet or an internal intra-net, from a remote network device, such as the server 128 or directly from a mass storage unit, such as storage unit 132.

For an implemented communication protocol, a verification process is performed to verify whether the implemented communication protocol mets the requirements for communicating according to the protocol specification. The verification process begins with the creation of a Petri net model of the communication protocol. A Petri net consists of an organization of nodes and arcs between the nodes. Nodes are of two types. A place node contains one or more tokens which are inputs to the place node. A transition node specifies an event or a firing rule associated with the inputs or tokens of the places that are connected to the transition node. Arcs connect only between a place node and a transition node. An arc relates places to transitions and transitions to places, thus forming an input function and an output function for each transition. A transition node may "fire" when all input tokens required by a transition node's firing rule are available. The Petri net then is a 5-tuple Net=$(P,T,F,M_0,W)$ where P is a set of places, T is a set of transitions, F is set of arcs that define a flow relation, $M_0$ initial marking or an initial state of the modeled system, and W is a set of arc weights which define the number of input tokens consumed on a transition. A software program may then be modeled by a Petri net by transforming the software program into a 5-tuple Net organization. Such a Petri net may be suitably used to model communicating automata and simple process algebras. A system modeled with a Petri net may then be transformed to an unfolded Petri net model. The unfolding of a system produces an occurrence net, a particularly simple type of Petri net without cycles. An unfolded Petri net model of a system is behaviorally equivalent to the system being modeled.

Unfolded Petri nets are usually infinite nets, and as a consequence they cannot generally be directly stored in a computer. However, K. McMillan observed in his Ph. D. Thesis, K. L. McMillan, "Symbolic Model Checking", Kluwer, 1993, that it is possible to construct a finite initial part of the unfolding containing as much information as the unfolding itself. Such an initial part is called a finite complete prefix. The set of reachable states of a finite complete prefix coincides with the set of reachable states of the system. Finite complete prefixes can be generated, stored in a computer, and used to check behavioral properties of the original system. One of the advantages of complete prefixes is that they can be much smaller than the state space of the system. Therefore, they represent a useful technique to attack the state explosion problem.

The original Petri net before unfolding describes state variables and transitions between the state variables. An unfolded net describes the possible firing sequences from the initial marking. Thus, different notations are used to support analysis of the original net and the corresponding unfolded net. For example, the process of unfolding a Petri net produces a pair (ON, φ) where ON=(B,E F') representing an occurrence net, which is a Petri net without cycles, self conflicts nor backward conflicts, and φ is a homomorphism from ON to N that associates the places/transitions of ON with the places/transitions of the Petri net. A homomorphism is a structure preserving mapping between an unfolded net and the original net. In the occurrence net ON, places and transitions are called conditions B and events E, respectively. The initial marking M0 defines a set of initial conditions B0 in ON such that the places initially marked are in 1-1 correspondence with the conditions in B0. The set B0 constitutes the "seed" of the unfolding. F' defines a flow relationship between conditions and events.

The ON net may contain multiple copies of the places and transitions of the original net which are identified with the homomorphism. Thus, φ would not be an identifiable object on the unfolded net but a property which can be verified by study of ON and N. The initial marking M0 is required before unfolding may be started. When the unfolding is started, B0 becomes the seed from which the rest of the unfolding originates.

After a high level Petri net model is created, unfolding techniques may be applied. An example of an unfolding technique was introduced by K. L. McMillan, "A Technique of State Space Search Based on Unfolding" pp. 45-65, Formal Methods in System Design 6(1) 1992 and incorporated by reference herein in its entirety. However, this method can suffer from redundancy which may cause portions of the net that are unfolded to become exponentially larger than the original net. Attempts have been made to address this problem, such as the approach by Chang-Hee Hwang and Dong-Ik Lee, "A Concurrency Characteristic in Petri Net Unfolding" Proceedings of IEEE Conference in System, Man and Cybernetics, pp. 4266-4273, 1997 which is incorporated by reference herein in its entirety. However, this method requires enumeration of the whole state space, thereby making it impractical for general nets. A study of a few commercial software packages that implement Petri net unfolding algorithms has been done by Victor Khomenko and Maciej Koutny, "Towards An Efficient Algorithm for Unfolding Petri Nets" Proceedings of the 12th International Conference on Concurrency Theory, pp. 366-380, 2001 and is incorporated by reference herein in its entirety. This study shows that computational requirements of these software packages increase non-linearly with an increase in size of the input net that is unfolded. Independent of the unfolding process, the techniques of the present invention may be applied to preprocess a Petri net model of a system such that the unfolding process has reduced computational requirements.

An unfolding methodology according to the present invention comprises five core segments: a Petri net model creation process, an input net analysis process, a subnet generation process, a subnet unfolding process, and a subnet joining process. The Petri net model creation process models logical interactions among parts or activities in a system. Typical situations that can be modeled by Petri net are synchronization, sequentiality, concurrency and conflict. As an example, two places x and y in an unfolding are said to be concurrent if no path of arrows can be followed from place x to place y, or vice versa. Also, there is no third place z from which both x and y can be reached.

The input net analysis process finds if there are unsuitable places in a Petri net model which cannot be used in subnet generation process. The subnet generation process identifies suitable places in an input net for subdividing and divides that input net into subnets. The subnet unfolding process begins by inputting subnets to unfolding net software to obtain an unfolding of the input subnets. An unfolded subnet joining process is then used to recreate an unfolding of the original input net.

Figure 2A:
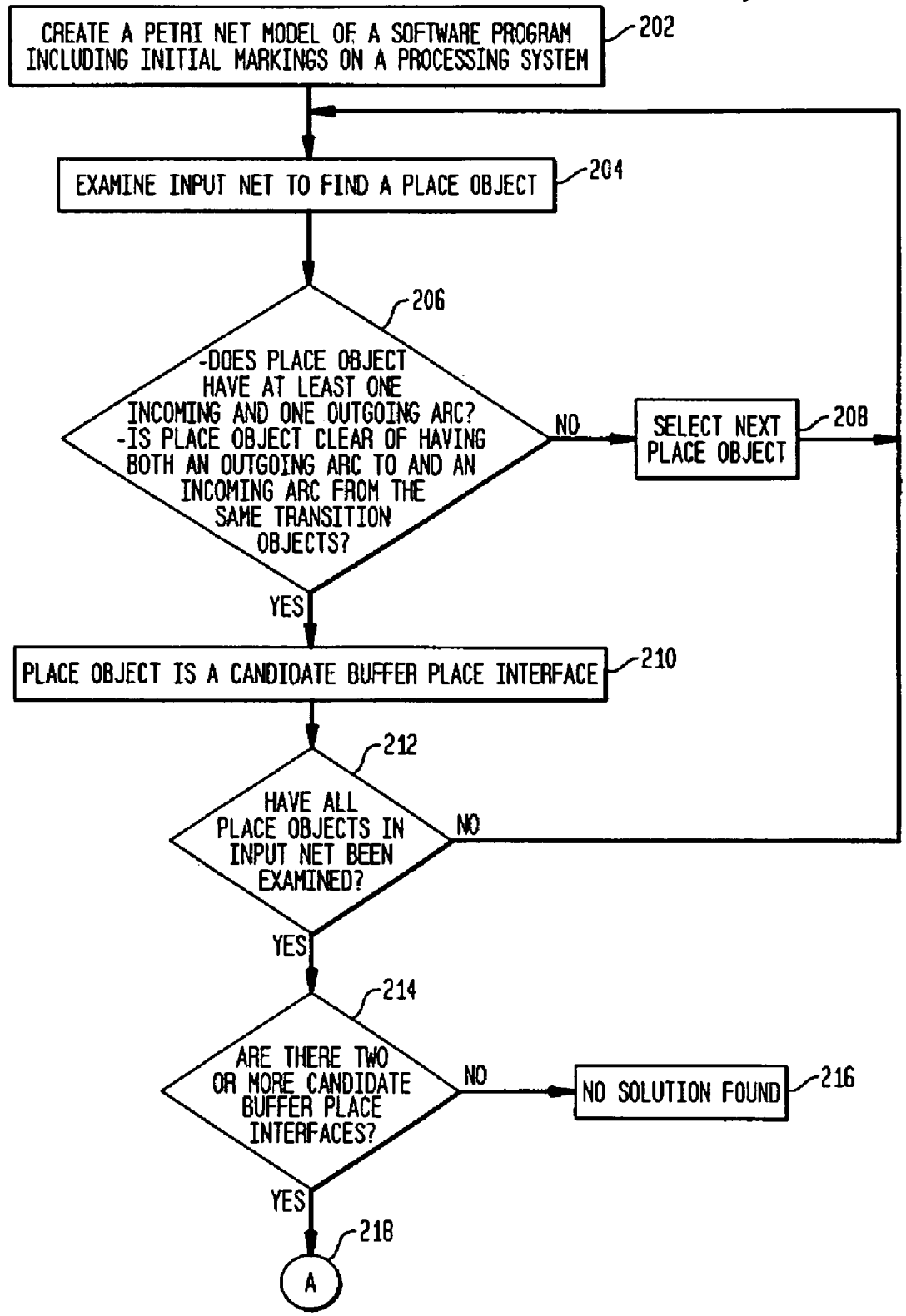
FIG. 2A illustrates an exemplary input net creation and analysis process in accordance with an embodiment of the present invention.

FIG. 2A illustrates an exemplary input net creation and analysis process 200 in accordance with an embodiment of the present invention. At step 202, a Petri net model including initial markings of the software program, communication protocol, or processing system is created and stored as an input net on a processing system, such as the programmed workstation system 100 of FIG. 1. At step 204, the input net is examined to find a place object. At step 206, the place object found in step 204 is examined to determine whether the place object has at least one incoming and one outgoing arc and whether the place object does not have an outgoing arc to and does not have an incoming arc from the same transition object. If the place object does not meet both criteria, is it not considered a candidate buffer place interface and the process 200 proceeds to step 208. At step 208, a next place object is selected from the input net and the process returns to step 204. Returning to step 206, if the place object meets both criteria it is considered a buffer place interface and the process 200 proceeds to step 210. At step 210, the identified place object is considered a candidate buffer place interface and is appropriately marked on the input net. At step 212, a determination is made whether all place objects in the input net have been examined. If all the place objects in the input net have not been examined, the process 200 returns to step 204 to continue with examining the input net.

Returning to step 212, if all place objects have been examined, the process 200 proceeds to step 214. At step 214, a determination is made whether there are two or more candidate buffer place interfaces found in the input net. If two or more buffer candidate place interfaces were not found, then the process 200 proceeds to step 216. At step 216, it is noted that no solution has been found for the input net, since two or more valid places, where the input net could be divided in accordance with an embodiment of the present invention, were not found. Returning to step 214, if two or more candidate buffer place interfaces were found, the process 200 proceeds to continuation point A 218. As used herein, a continuation point is a link to other processes used to unfold an input net.

Figure 2B:
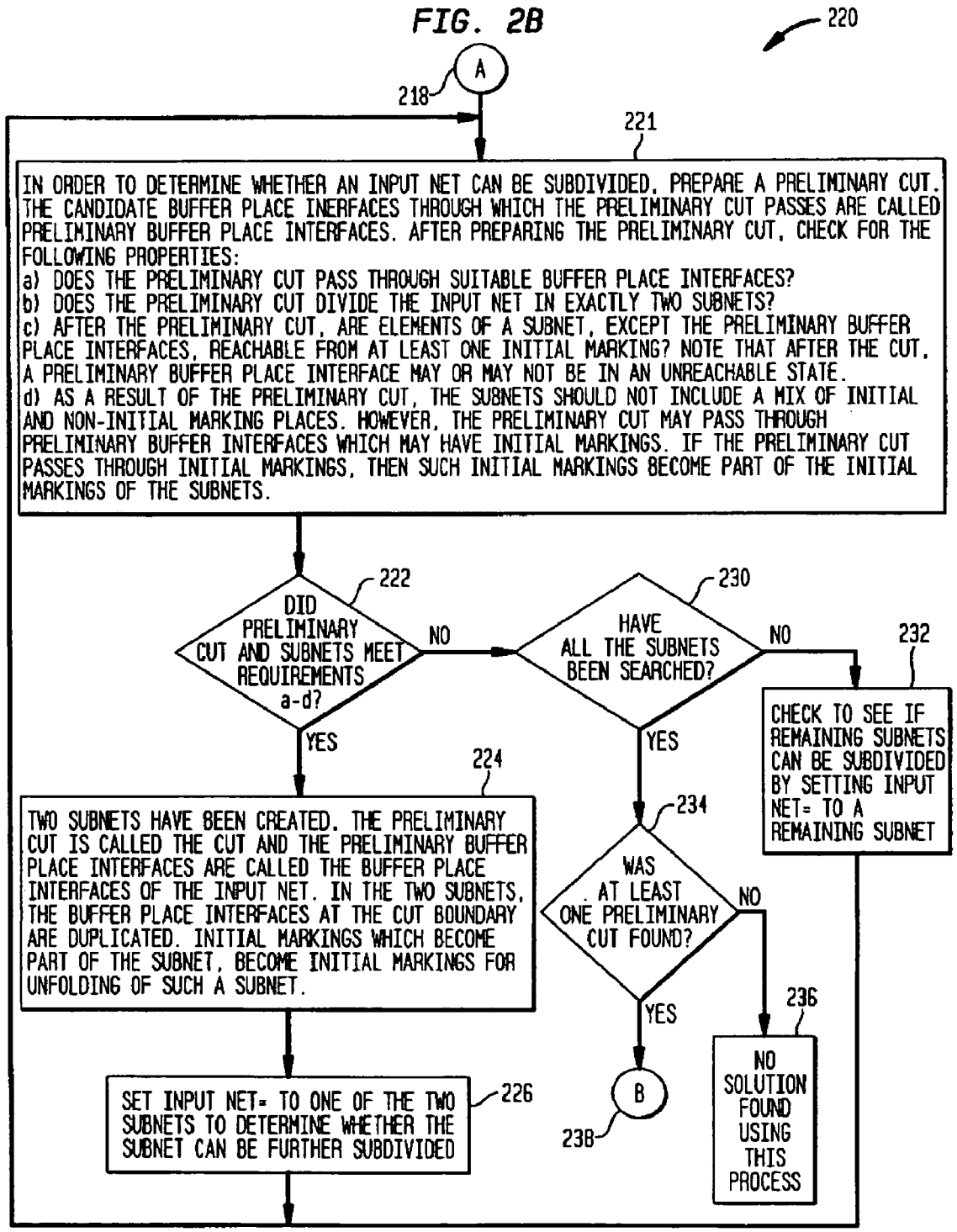
FIG. 2B illustrates an exemplary subnet generation process in accordance with an embodiment of the present invention.

FIG. 2B illustrates an exemplary subnet generation process 220 in accordance with an embodiment of the present invention. At continuation point A 218, a subnet generation process 220 begins. At step 221, a preliminary cut is prepared in order to determine whether an input net can be subdivided. The preliminary cut is a hypothetical line drawn through candidate place objects of the net, where the starting point and the ending point are the same point. The candidate buffer place interfaces through which the preliminary cut passes are called the preliminary buffer place interfaces. In response to the preliminary cut, a check is made for the following properties. Does the preliminary cut pass through suitable buffer place interfaces? In a presently preferred embodiment, suitable buffer place interfaces include only the candidate buffer place interfaces determined in step 206 of FIG. 2A. Does the preliminary cut divide the input net in exactly two subnets? After the preliminary cut, are elements of a subnet, other than the suitable buffer place interfaces, reachable from at least one initial marking? In a presently preferred embodiment, all elements of a subnet, except the suitable buffer place interfaces, are checked to be reachable from at least one initial marking. It is appreciated that such testing need not be limited to only step 221. For example, in determining whether a place object is a candidate buffer place interface, as in step 206 of FIG. 2A, a transition element may also be determined to be reachable from a place object having an initial marking. Thus, a further evaluation of reachability in step 221 of FIG. 2B for that transition element need not be repeated. Note that after the cut, a preliminary buffer place interface may or may not be in an unreachable state. As a result of the preliminary cut, the subnets should not include a mix of initial marking and non-initial marking places. However, the preliminary cut may pass through preliminary buffer interfaces which may have initial markings. If the cut passes through initial markings, then such initial markings become part of the initial markings of the subnets.

At step 222, it is determined whether the preliminary cut met the requirements a-d of step 221. If these requirements have been met, the subnet generation process 220 proceeds to step 224. At step 224, two subnets have been created. If all the requirements a-d of step 221 are met, then the preliminary cut is called "the cut" and the preliminary buffer place interfaces are called "the buffer place interfaces" of the input net. In the two subnets, the buffer place interfaces at the cut boundary are duplicated. Initial markings M0 which become part of a subnet, become an initial seed B0 for unfolding of such a subnet. At step 226, the input net is replaced by one of the two subnets to determine whether the selected subnet can be further subdivided. The subnet generation process 220 returns to step 221 where processing of the subnet continues.

Returning to step 222, if it has been determined that the requirements a-d were not met, then the subnet generation process 220 proceeds to step 230. At step 230, it is determined whether all subnets have been searched. If all subnets have not been searched, the process 220 proceeds to step 232. At step 232, the input net is replaced by one of the remaining subnets and the process proceeds to step 221 to process the next subnet.

Returning to step 230, if it is determined that all subnets have been searched, then the subnet generation process 220 proceeds to step 234. At step 234, it is determined whether at least one preliminary cut was found that met the requirements a-d of step 221. If no preliminary cut was found that met the requirements, then the process 220 proceeds to step 236. At step 236, it is noted that no solution has been found for the input net using this process, since the original input net could not be subdivided. Returning to step 234, if at least one preliminary cut was found that met the requirements, then the process 220 proceeds to continuation point B 238.

Figure 2C:
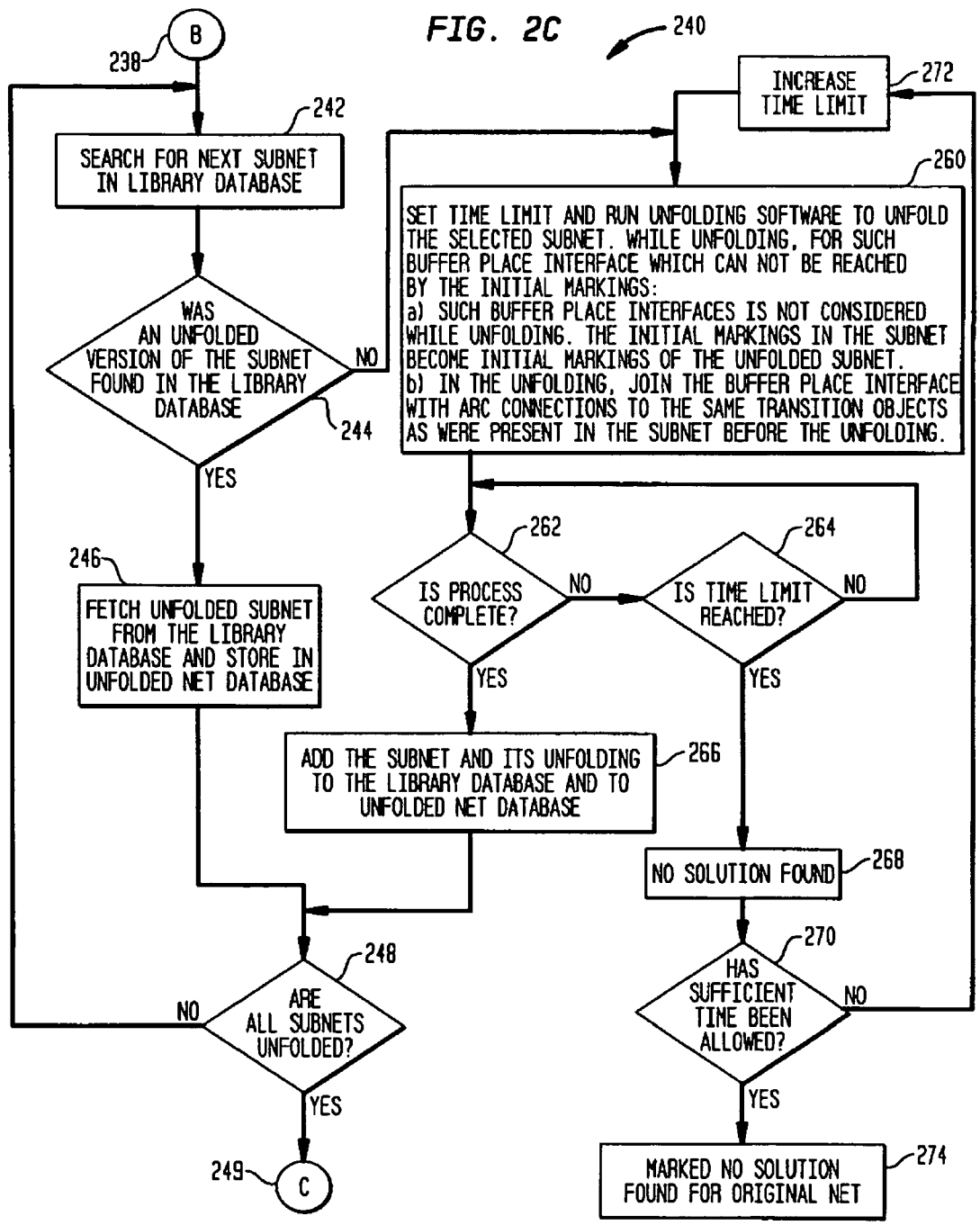
FIG. 2C illustrates an exemplary unfolding process in accordance with an embodiment of the present invention.

FIG. 2C illustrates an exemplary unfolding process 240 in accordance with an embodiment of the present invention. At continuation point B 238, the unfolding process 240 begins. At step 242, a library database, such as the library database 144 of FIG. 1, is searched for the next subnet beginning with one of the subnets of the subdivided input net. At step 244, it is determined whether an unfolded version of the subnet was found in the library database. If an unfolded version of the subnet was found, the unfolding process 240 proceeds to step 246. At step 246, the unfolded subnet is fetched from the library database and stored in an unfolded net database, such as unfolded net database 144 of FIG. 1. At step 248, a determination is made whether all subnets have been unfolded. If all subnets have not been unfolded, the unfolding process 240 returns to step 242.

Figure 2D:
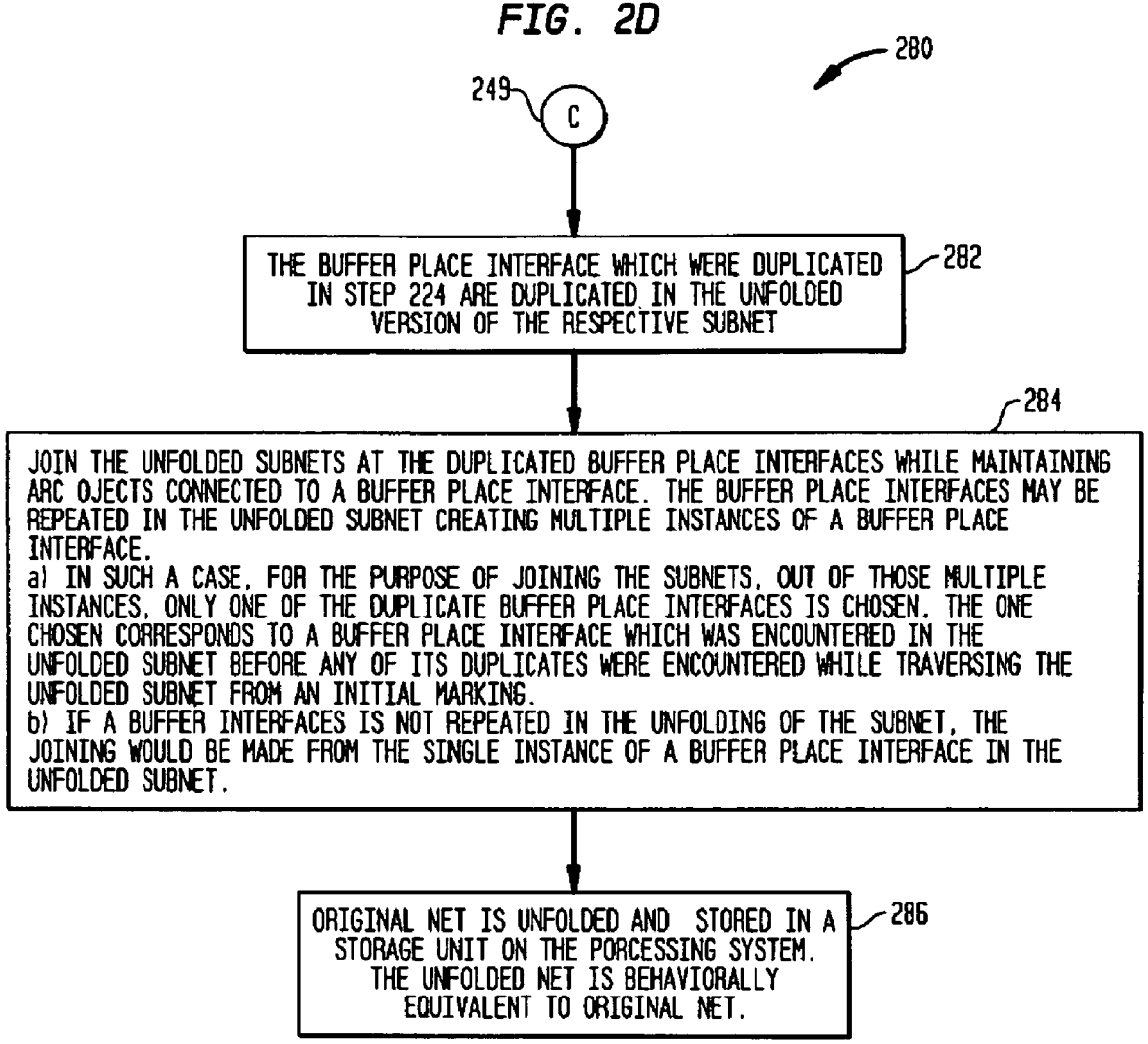
FIG. 2D illustrates an exemplary joining process in accordance with an embodiment of the present invention.

At step 248, if all subnets have been unfolded, the unfolding process 240 proceeds to continuation point C 249. At continuation point C 249, each of the subnets have been unfolded by either fetching an unfolded version of the subnet stored in the library database as addressed in step 246 or by unfolding the subnet as addressed in step 260. FIG. 2D illustrates an exemplary joining process 280 in accordance with an embodiment of the present invention. At continuation point C 249, the joining process 280 begins. At step 282, the buffer place interfaces that were duplicated in step 224 of FIG. 2B are duplicated in the unfolded version of the respective subnet. At step 284, the unfolded subnets are joined at the duplicated buffer place interface while maintaining arc objects connected to the buffer place interface. If the buffer place interfaces may be repeated in the unfolded subnet creating multiple instances of the buffer place interface. In such a case, for the purpose of joining the subnets, out of those multiple instances one of the duplicate buffer place interface is chosen. The one chosen corresponds to a buffer place interface which was encountered in the unfolded subnet before any of its duplicates are encountered while traversing the unfolded subnet from an initial marking. If a buffer place interface is not repeated in the unfolding of the subnet, the Joining would be made from the single instance of a buffer place interface in the unfolded subnet. After all the unfolded subnets are joined, the original input net can be considered unfolded and this unfolding process 280 ends at step 286. The unfolded net is stored in a storage unit, such as storage unit 132 of FIG. 1, on the processing system. The unfolded net, due to the processes of FIG. 2A-D, is behaviorally equivalent to the original net.

Returning to step 244, if it was determined that an unfolded version of the subnet was not found, the unfolding process 240 proceeds to step 260. At step 260, a time limit is set based on a time limit parameter passed into the program and the selected subnet is unfolded by application of unfolding software, such as utilizing the unfolding technique introduced by K. L. McMillan, the approach by Chang-Hee Hwang and Dong-Ik Lee, or the like. While unfolding, a buffer place interface which can not be reached by the initial marking, such buffer place interface is not considered while unfolding. The initial markings in the subnet become initial markings of the unfolded subnet. In the unfolding, the buffer place interface is joined with arc connections to the same transition objects as were present in the subnet before the unfolding.

At step 262, the subnet unfolding process of step 260 is checked for completion. If the process is not complete, a check is done in step 264 to see if the time limit is reached. If the time limit has not been reached, the subnet unfolding process continues at step 262. At step 262, if the subnet unfolding process completed, the unfolding process 240 proceeds to step 266. At step 266, the subnet and its unfolded version are added to the library database, such as the library database 144 of FIG. 1, and to the unfolded net database, such as unfolded net database 144 of FIG. 1. The unfolding process 240 proceeds to step 248 and the process continues as described above.

Returning to step 264, if the subnet unfolding process of step 260 did not find an unfolding for the subnet within the specified time limit, the unfolding process 240 proceeds to step 268. At step 268, it is noted that the subnet unfolding process did not find a solution within the allotted time. At step 270, a determination is made whether sufficient time has been allowed to find a subnet unfolding. If it is determined that additional time should be allowed, the unfolding process 240 proceeds to step 272 where the time limit parameter is increased and the unfolding process 240 proceeds to step 260 to continue with the subnet unfolding algorithm. For example, an operator of the processes illustrated in FIGS. 2A-2D, may manually increase the time limit parameter or an automated increment method may be used to increase the time limit up to a specified maximum. At step 270, if it is determined that sufficient time has been allowed to find a solution, the unfolding process 240 proceeds to step 274. At step 274, the selected subnet is marked as not having a solution and as a result the original input net is also marked as not having a solution. If no solution is found, alternative methods of testing the software must be used.

It is generally a difficult problem to divide a Petri net model into subnets, perform the unfolding of the subnets, and then join the unfolded subnets since there is no proof that the resulting unfolding after joining unfolded subnets would be a correct unfolding of the original input net. Further, there is no generally known method to perform joining of two unfolded net to recreate an unfolding of an original net.

However, the present invention solves such problems. The unfolding process described in reference to FIGS. 2A-2D advantageously overcomes the disadvantages of applying unfolding techniques, such as McMillan and Chang-Hee-Hwang, by reducing the input net to multiple subnets and applying these and other such techniques on each of the subnets. The techniques described herein divide an original input net into subnets in such a manner that an exact unfolding of the original net can be recreated from the unfolding of the subnets. Also, unfolded subnets can be joined to create a valid unfolding of the original net. Further, the subnets may also be subdivided to further reduce the size of the net on which the unfolding process is applied. Since, the computational requirement of the unfolding process increases non-linearly with the increase in size of net to unfold, this reduction in size achieves improvements in the unfolding process by reducing the total numbers of states on which the unfolding process operates. Thus, the computational requirements of the unfolding process are reduced by applying the unfolding process on the subdivide nets.

Figure 3:
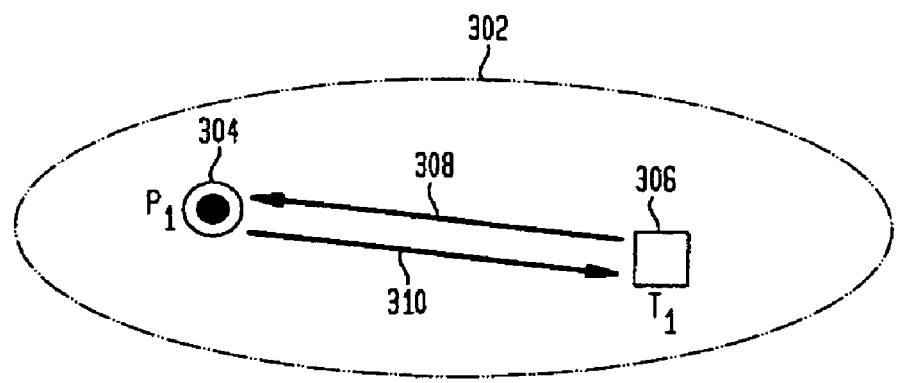
FIG. 3 illustrates two organizations of places, transitions, and arcs for the purposes of identification of a candidate buffer place interface in accordance with the present invention.
Figure 3:
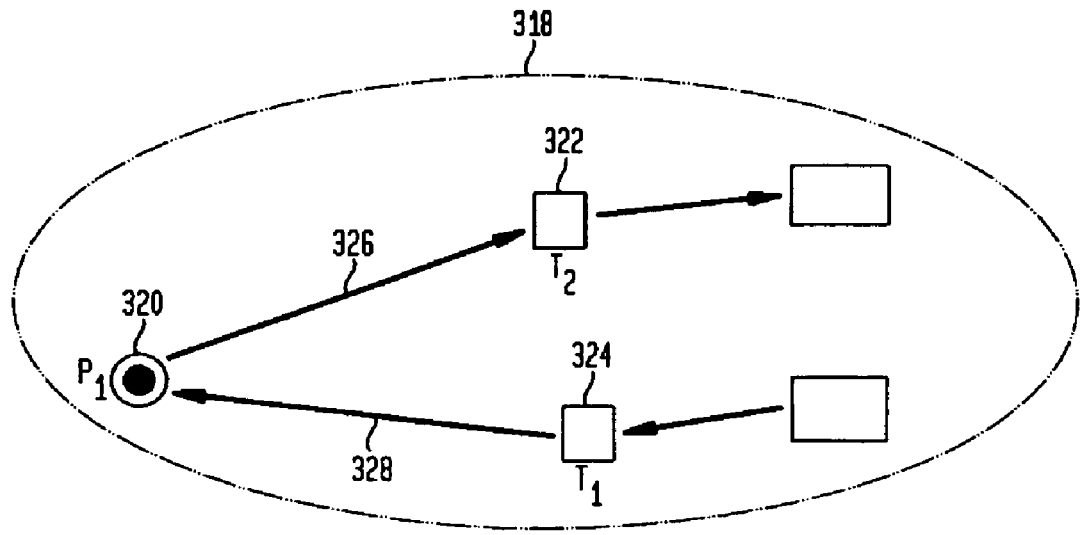

FIG. 3 illustrates two organizations 300 of places, transitions, and arcs for the purposes of identification of a candidate buffer place interface in accordance with the present invention. The first organization 302 consisting of place 304, transition 306, incoming arc 308, and outgoing arc 310. Place object 304 does not meet the requirements stated in step 206 of FIG. 2A since the place object 304 has an outgoing arc 310 to and an incoming arc 308 from the same transition object. However, the second organization 318, consisting of place 320, transition 322, transition 324, outgoing arc 326, and incoming arc 328, would be considered a buffer place interface since the requirements of step 206 in FIG. 2 would be met.

FIG. 4A illustrates an exemplary input net model 400 of a communication protocol before unfolding showing where a preliminary cut passing through preliminary buffer place interfaces may be made in accordance with an embodiment of the present invention. For example, the communication protocol modeled by the input net model 400 includes places and transitions corresponding to states and events to communicate packets of data and acknowledgements in a communication channel. The input net model 400 includes places P1-P12, transitions T1-T10, arcs connecting places with transitions, and an initial marking M0 depicted by ● in places P2 and P6. The exemplary communication protocol begins operation in a state where a data packet has been sent at place P2 and earlier sent data packet has been received at P6. Place P1 corresponds to state data packet is ready to be sent. Transition T1 indicates the event of sending the packet. Place P9 corresponds to the state where the packet entered the communication channel. While communicating over a communication channel, delays may be encountered, for example, due to the length of the channel, and such a communication delay is represented by transition T9. At the end of the communication channel, the packet is out of the communication channel and available to be received at place P10. The event of receiving the packet corresponds to transition T5 and the packet is received at place P6, which is one of the initial markings of the input net.

In operation, the send buffers are cleared next at transition T6 and an acknowledgement is ready to be sent at place P7. The event of sending the acknowledgement corresponds to transition T7 and the acknowledgement having been sent corresponds to place P8. Transition T8 corresponds to placing the received packet in an upper layer queue. At this point, the communication channel is ready to receive a new packet and this state corresponds to place P5. When a new packet arrives, the event of receiving the new packet corresponds to transition T5 and the communication process continues.

The sending of the acknowledgement at Transition T7 also enters an acknowledgement packet in the communication channel at place P11. Communication delays of the channel correspond to transition T10 and at the end of the communication channel, the packet is out of the communication channel and available to be received at place P12. The event of receiving the acknowledgement packet corresponds to transition T3. A new data packet is then prepared for processing at place P4. The upper layer protocol stack enters the new data packet into a send queue at transition T4 and the new data packet is ready to be sent at place P1. Transition T1 indicates the event of sending the packet and place P2 corresponds to the packet having been sent, which is one of the initial markings of the input net. After the packet has been sent, transition T2 corresponds to clearing the receive buffers to prepare to receive further acknowledgement packets and place P3 corresponds to the state of being ready to receive another acknowledgement packet. The event of receiving another acknowledgement packet corresponds to transition T3 and the communication process continues.

In an analysis of the input net model 400, it is determined that places P1-P12 are all candidate buffer place interfaces meeting the requirements specified by step 206 of FIG. 2A. A preliminary cut 402 is made through preliminary buffer place interfaces P10 and P12 meeting the requirements a-d of step 221 of FIG. 2B. Since the requirements a-d of step 221 are met, the preliminary cut is the cut and the preliminary buffer place interfaces are the buffer place interfaces. The input net model 400 is split into a first subnet having places P1-P4, P9, P10, and P12, transitions T-T4 and T9 and a second subnet having places P5-P8, P10, P11, and P12. The first and second subnets cannot be subdivided any further.

Figure 4B:
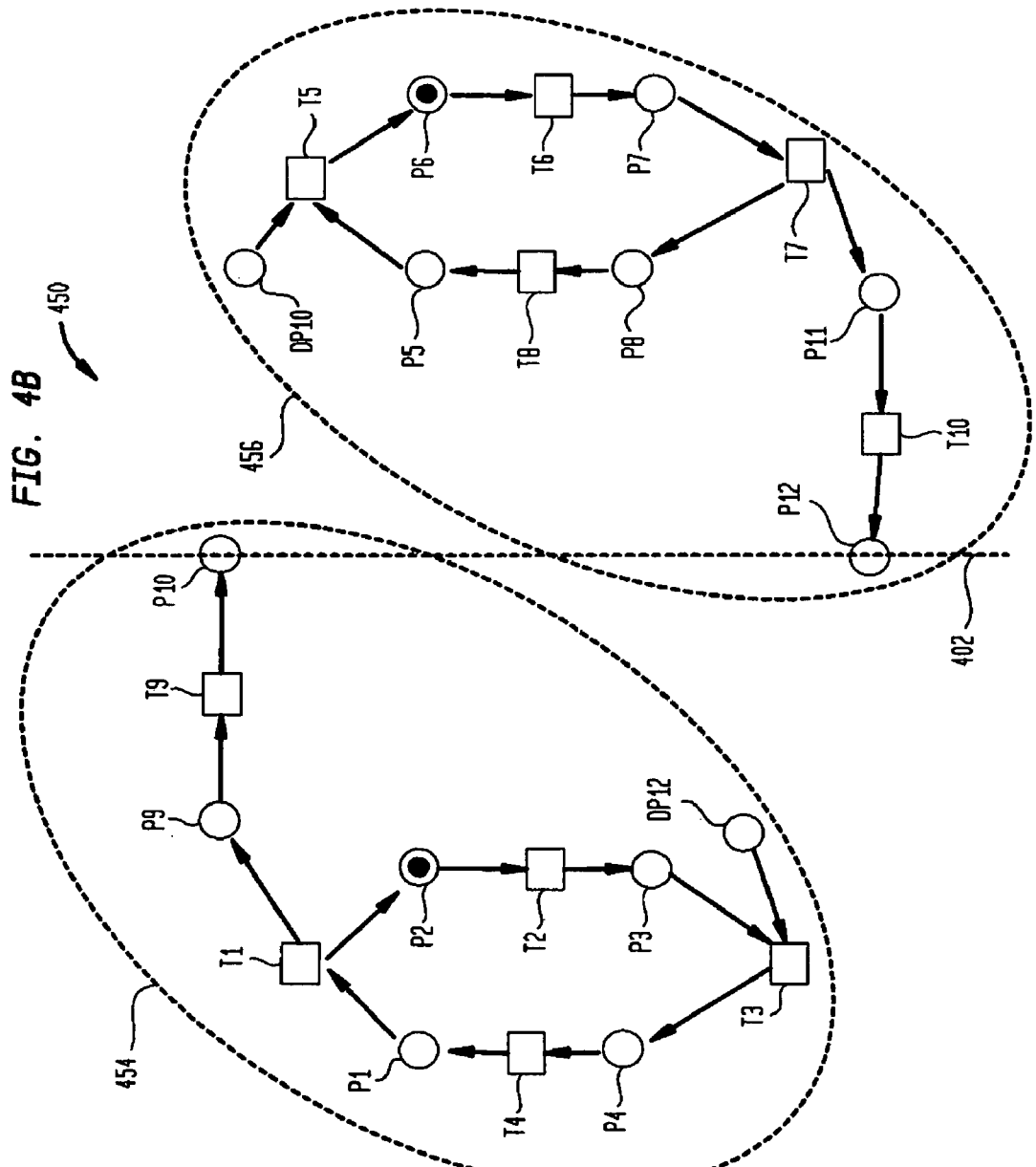
FIG. 4B illustrates two subnets based on the preliminary cut of FIG. 4A made in accordance with an embodiment of the present invention.

FIG. 4B illustrates two subnets 454 and 456 that are based on the preliminary cut 402 of FIG. 4A made in accordance with an embodiment of the present invention. In FIG. 4B, the two subnets 454 and 456 are shown prior to unfolding and include a duplicate of P12, labeled as DP12, in subnet 454 and a duplicate of P10, labeled as DP10, in subnet 456. A further examination of the subnets 454 and 456 indicates the subnets cannot be subdivided. In the subnet 454, for example, a preliminary cut across P4 and P3 would leave T3 in an unreachable state from the initial marking in P2. Thus, the cut across P4 and P3 is not a valid cut, due to requirement c of step 221 of FIG. 2B not being met. A preliminary cut across P1 and P3 would leave T4, P4, T3 in an unreachable state. This preliminary cut is also not a valid cut in that requirement c is similarly not met.

In the subnet 456, for example, a preliminary cut across P11, P12 would leave P11, P12, T10 in an unreachable state from the initial marking in P6, so it is not a valid cut. Again, requirement c was not met for the preliminary cut across P11 and P12. Another preliminary cut from P5, P8 would leave T5 in an unreachable state, so it also does not meet requirement c and is not a valid cut. A further preliminary cut across P7, P8, P11 would leave T0, P12 in an unreachable state. Thus, the preliminary cut across P7 P8, and P11 is not a valid cut due to it not meeting requirement c. Therefore the two subnets 454 and 456 cannot be further subdivided.

Figure 5:
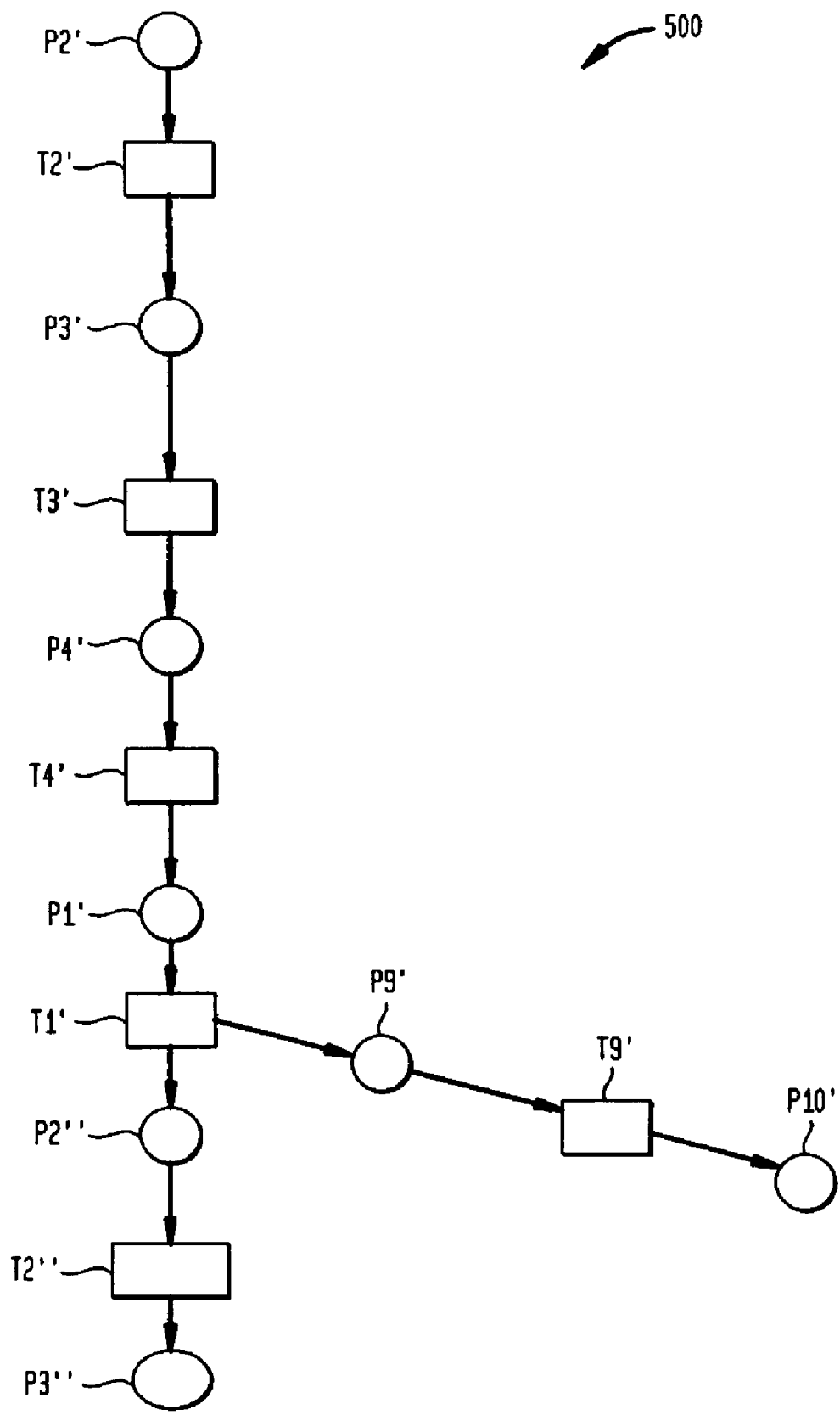
FIG. 5 illustrates an exemplary unfolded first subnet of a divided input net model in accordance with an embodiment of the present invention.

FIG. 5 illustrates an exemplary unfolded first subnet 500 of a divided input net model in accordance with an embodiment of the present invention. The unfolded first subnet 500 may have been fetched from a library database, as indicated in step 246 of FIG. 2C, having a subnet similar to the first subnet and a corresponding unfolding of the subnet. The unfolded first subnet 500 may also have been formed by unfolding software as indicated in step 260 of FIG. 2C.

Places correspond to conditions in an unfolded net and are identified by convention by adding 'or" to a corresponding place name in the input net. In a similar manner, for places that are repeated in an unfolded net, a " is added as a convention to identify conditions that correspond to repeated places in subdivided unfolded nets.

Similarly, transitions correspond to events in an unfolded net and are identified by adding 'or" to a corresponding event name. Since unfolding may result in a very large graph, unfolding may have to be truncated to a finite fragment, to be useful. This truncation may be done by applying a cut-off criteria to an unfolded net as per McMillan's cut-off algorithm or by applying another cut-off algorithm appropriate for the modeled system. With regard to FIG. 5, for example, such a cut-off criteria would be the transition T2". Since an end point of an unfolded net is required to be a place object, place object P3" is added to the unfolded first subnet 500.

Figure 6:
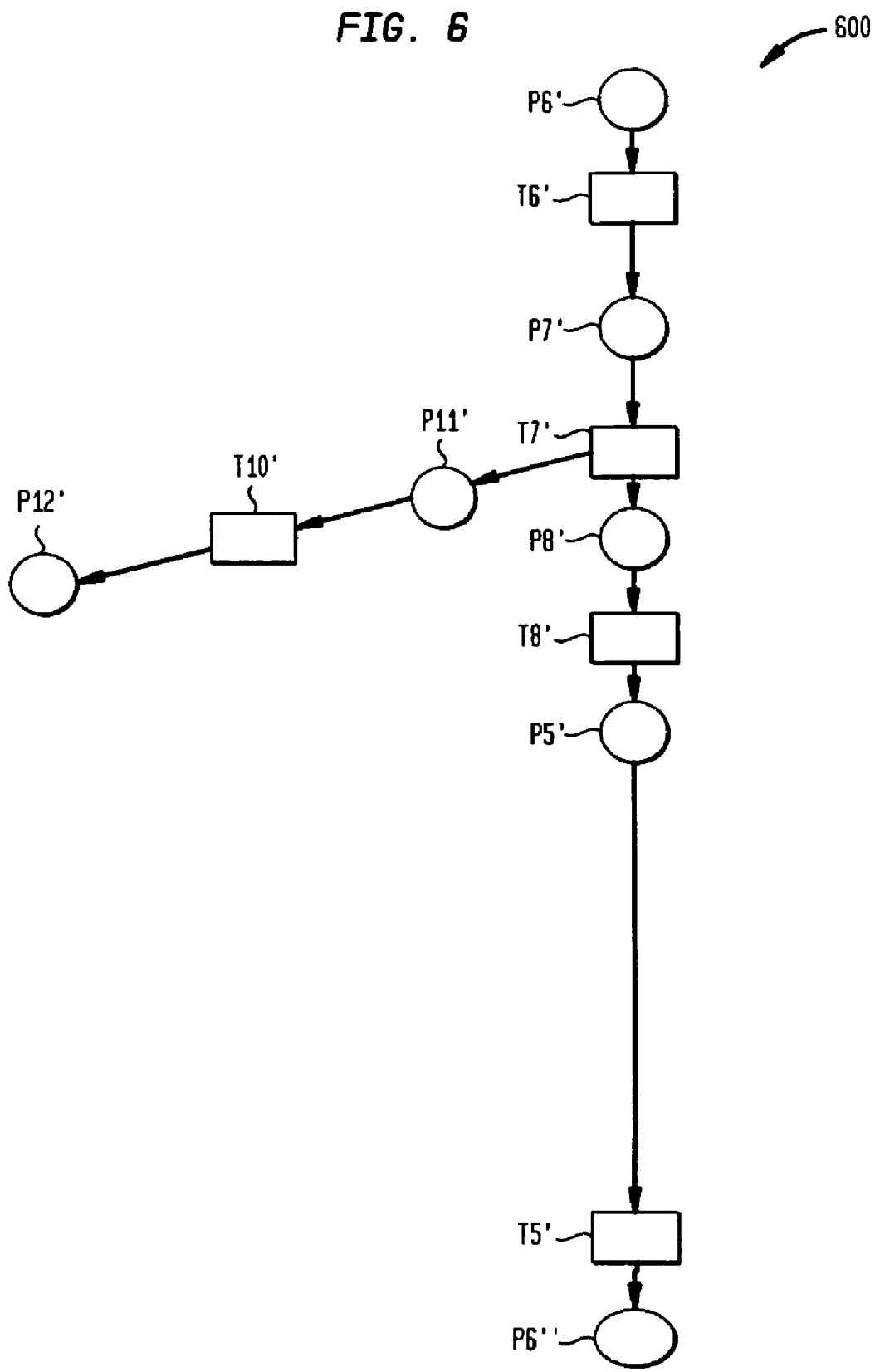
FIG. 6 illustrates an exemplary unfolded second subnet of a divided input net model in accordance with an embodiment of the present invention.

FIG. 6 illustrates an exemplary unfolded second subnet 600 of a divided input net model in accordance with an embodiment of the present invention. The unfolded second subnet 600 may have been fetched from a library database, as indicated in step 246 of FIG. 2C, having a subnet similar to the first subnet and a corresponding unfolding of the subnet. The unfolded first subnet 600 may also have been formed by unfolding software as indicated in step 260 of FIG. 2C.

Figure 7:
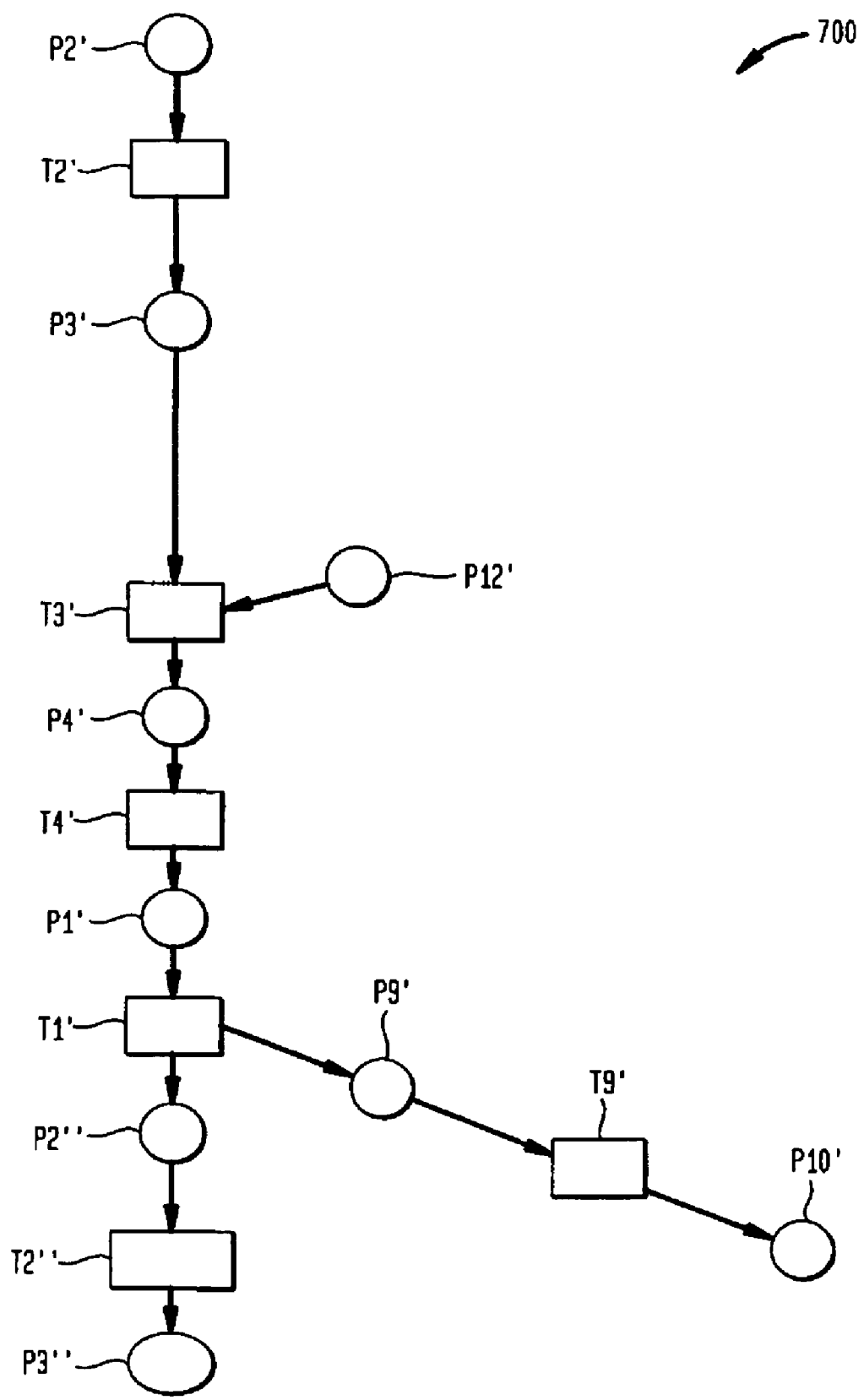
FIG. 7 illustrates an updated unfolded first subnet that includes a buffer place interface which was unreachable from initial marking, but which was part of the preliminary cut in accordance with an embodiment of the present invention.

FIG. 7 illustrates an updated unfolded first subnet 700 that includes a buffer place interface which was unreachable from the initial marking, but is part of the preliminary cut in accordance with an embodiment of the present invention. As indicated in step 260 of FIG. 2C, place P12' has been added with an arc connection to transition T3'.

Figure 8:
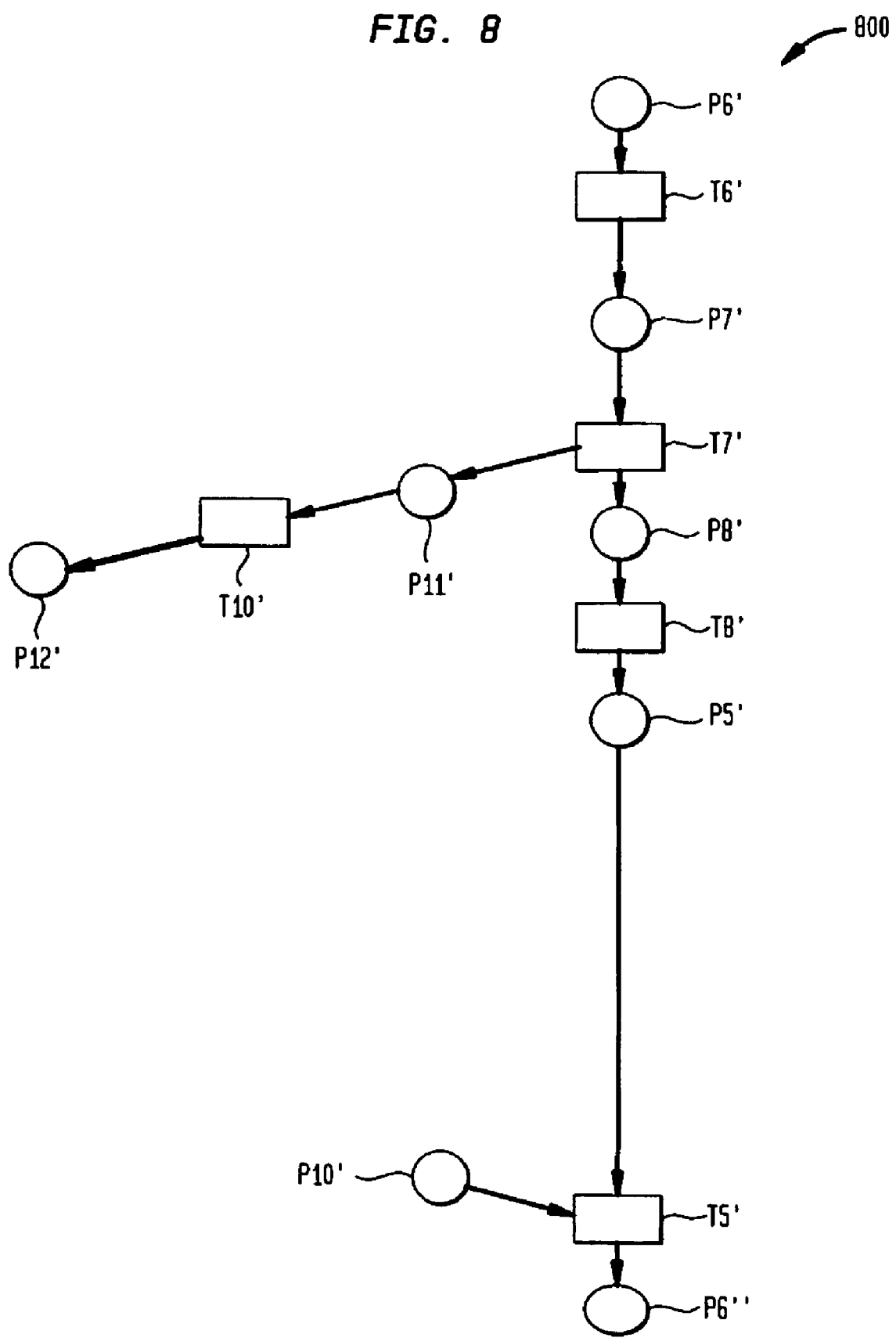
FIG. 8 illustrates an updated unfolded second subnet that includes a buffer place interface which was unreachable from initial marking, but which was part of the preliminary cut in accordance with an embodiment of the present invention.

FIG. 8 illustrates an updated unfolded second subnet 800 that includes a buffer place interface which was unreachable from the initial marking, but is part of the preliminary cut in accordance with an embodiment of the present invention. As indicated in step 260 of FIG. 2C, place P10' has been added with an arc connection to transition T5'.

Figure 9:
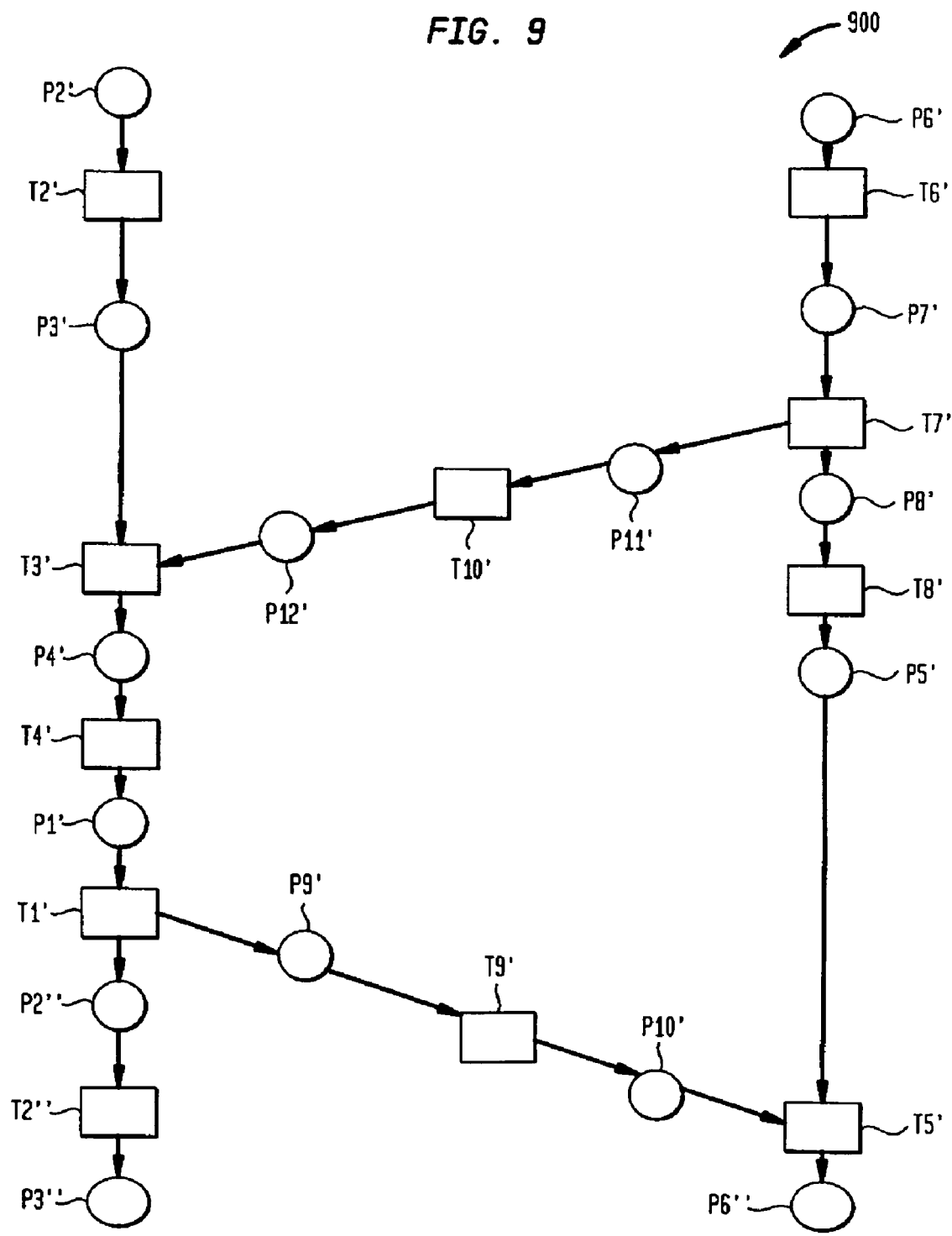
FIG. 9 illustrates an unfolded net that was formed by joining the updated unfolded first subnet and updated unfolded second subnet in which the unfolded net is behaviorally equivalent to the input net model of the communication protocol before unfolding of FIG. 4 in accordance with an embodiment of the present invention.

FIG. 9 illustrates an unfolded net 900 that was formed by joining the updated unfolded first subnet 700 and updated unfolded second subnet 800 in which the unfolded net 900 is behaviorally equivalent to the input net model 400 of FIG. 4A of the communication protocol before unfolding in accordance with an embodiment of the present invention. It is also noted that the initial marking M0 which is depicted by ●in FIG. 4A is not used in the unfolding process. Instead, M0 becomes the seed B0 of the unfolded net. For example, B0 includes P2' and P6'. The joining process follows step 284 of FIG. 2D, by which process the updated unfolded first subnet 700 and updated unfolded second subnet 800 are joined.

The unfolded input net model of a software program, communication protocol, or processing system, for example, may be used to verify the operation of the modeled system. Such verification maybe accomplished, for example, by utilizing the unfolded network in a process to generate test cases for the software program, communication protocol, or processing system which was originally modeled.

Engineering changes may occur not only to correct problems in a program, protocol, or system, but to extend the program, protocol, or system with new capabilities for a new product. An engineering change may be significant in the scope of changes to an existing system that may have already been verified to meet requirements.

If a particular change can be localized to a specific subnet, the changed subnet may be processed according to the unfolding methodology shown in FIGS. 2A, 2B, and 2C and joined into the rest of the unfolded net in step 252 of FIG. 2C. After dividing original input net into smaller subnets, if an identical subnet is found in the database, then unfolding of such identical subnets are fetched from the database. For the remaining subnets whose unfolding are not found in the database, such subnets are processed according to the unfolding methodology shown in FIGS. 2A, 2B, and 2C and joined into the rest of the unfolded net in step 252 of FIG. 2C. If after dividing the original input net into smaller subnets and no identical subnets are found in the database, then these subnets are processed according to the unfolding methodology shown in FIGS. 2A, 2B, and 2C and joined into the rest of the unfolded net in step 252 of FIG. 2C. If a particular change can not be localized to a specific subnet, the change would be reflected in the original input net and the whole net would be reprocessed as a new net as described above.

The methods described in connection with the embodiments disclosed herein may be embodied directly in hardware, in a software program executed by a processor, or in a combination of the two. A software program may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the present invention has been disclosed in a presently preferred context, it will be recognized that the present teachings may be adapted to a variety of contexts consistent with this disclosure and the claims that follow. For example, the present invention is disclosed mainly in the context of verification of a communication protocol. It will be appreciated that it may also be employed for the purposes of modeling, formal analysis, and design of discrete event systems. Some of the examples of industrial application of such systems are performance analysis of a robotic assembly system, software programs, analysis of a disturbance in signal transduction pathways in medical sciences for the analysis of many diseases, modeling and validation of metabolic network, such as, a metabolic network in the potato tuber, software safety analysis of a real-time system, modeling and analysis of communication protocols, modeling of networks-on-chip (NoCs), communication scenarios, and the like. It will also be appreciated that variations in the particular hardware and software employed are feasible, and to be expected as both evolve with time. For example, Petri net modeling, analysis, and unfolding tools are expected to evolve with time and technology developments. Other such modifications and adaptations to suit a particular design application will be apparent to those of ordinary skill in the art.

We claim:

1. A computer-implemented method for unfolding an input net model of a system to generate a behaviorally equivalent unfolded output net, wherein the input net model includes place objects, transition objects, arcs between place objects and transition objects, and initial markings, the method comprising:

selecting two or more place objects from the input net model as candidate buffer place interfaces;

subdividing the input net model with a preliminary cut to form two subnets, wherein the preliminary cut passes through a first set of candidate buffer place interfaces, such that objects of each of the subnets other than the first set of candidate buffer place interfaces are reachable from at least one initial marking, and the subnets do not include a mix of initial and non-initial marking places;

unfolding each of the two subnets to form two unfolded subnets;

joining the two unfolded subnets to form the unfolded output net; and storing the unfolded net in a storage unit of a computer, wherein at least one of the subdividing, the unfolding, and the joining is performed by the computer.

2. The method of claim 1 wherein each of the two or more candidate buffer place interfaces is a place object that has at least one incoming and one outgoing arc and is clear of having both an outgoing arc to and an incoming arc from the same transition object.

3. The method of claim 1 further comprising:
duplicating the first set of candidate buffer place interfaces at the preliminary cut boundary.

4. The method of claim 3 further comprising:
applying initial markings which become part of a subnet to the unfolded subnet.

5. The method of claim 1 further comprising:
performing the method for unfolding on one of the subnets if it is determined that the subnet may be subdivided into two further subnets by a cut passing through a second set of candidate buffer place interfaces such that objects of each of the further subnets other than the second set of candidate buffer place interfaces are reachable from at least one initial marking, and the further subnets do not include a mix of initial and non-initial marking places.

6. The method of claim 1 wherein the unfolding comprises:
finding in a library database an unfolded subnet corresponding to at least one of the at least two subnets;
fetching the unfolded subnet found in the library database; and
storing the fetched unfolded subnet in an unfolded net database.

7. The method of claim 1 wherein the unfolding comprises:
running an unfolding algorithm to unfold the selected subnet.

8. The method of claim 7 further comprising:
removing candidate buffer place interfaces that can not be reached by the initial markings from unfolding consideration; and
applying initial markings which become part of a subnet to the unfolded subnet.

9. The method of claim 7 further comprising:
joining each of the first set of candidate buffer place interfaces with arc connections to the same transition objects as were present in the subnet before the unfolding.

10. The method of claim 7 further comprising:
setting a time limit for running the unfolding algorithm; and
allowing an operator to manually increase the time limit if the time limit is reached and the algorithm is still running.

11. The method of claim 7 further comprising:
storing the subnet and its unfolding in a library database and an unfolded net database.

12. The method of claim 4 wherein the joining comprises:
duplicating the first set of candidate buffer place interfaces that were duplicated at the preliminary cut boundary and had initial markings of a subnet; and
joining the unfolded subnets at the duplicated first set of candidate buffer place interfaces while maintaining arc object connections.

13. The method of claim 12 further comprising:
choosing one of the first set of candidate buffer place interfaces for the purpose of joining the subnets, wherein the chosen first set of candidate buffer place interface corresponds to a buffer place interface which was encountered in the unfolded subnet before any of its instances were encountered while traversing the unfolded subnet from an initial marking.

14. The method of claim 3 further comprising:
joining the unfolded subnets at buffer place interfaces which do not have multiple instances in unfolded subnets.

15. A computer-readable medium storing computer programs which cause a computer system to perform unfolding an input net model of a system to generate a behaviorally equivalent unfolded output net, wherein the input model includes place objects, transition objects, arcs between place objects and transition objects, and initial markings, the computer readable medium comprising:

selecting two or more place objects from the input net model as candidate buffer place interfaces;

subdividing the input net model with a preliminary cut to form two subnets, wherein the preliminary cut passes through a first set of candidate buffer place interfaces, such that objects of each of the subnets other than the first set of candidate buffer place interfaces are reachable from at least one initial marking, and the subnets do not include a mix of initial and non-initial marking places;

fetching from a library database at least one unfolded subnet corresponding to one of the two subnets as a first unfolded subnet;

unfolding the remaining subnet to form a second unfolded subnet;

joining the first unfolded subnet and the second unfolded subnet to form the unfolded output net; and storing the unfolded net in a storage unit of the computer system, wherein at least one of the subdividing, the fetching, the unfolding, and the joining is performed by the computer system.

16. The computer-readable medium of claim 15 further comprises:
running Petri net modeling software to form the input net model of a system;
running a Petri net unfolding algorithm to perform the unfolding; and
joining each buffer place interface in both unfolded subnets with arc connections to the same transition objects as were present in each subnet before the unfolding.

17. The computer-readable medium of claim 15 further comprises:
storing the remaining subnet and its corresponding second unfolded subnet in the library database.

18. A computer-implemented method for unfolding on a processing system an input net model of a communication protocol to generate a behaviorally equivalent unfolded output net, wherein the input net model includes place objects, transition objects, arcs between place objects and transition objects, and initial markings that are representative of the communication protocol, the method comprising:

identifying two or more place objects from the input net model, with each identified place object being a buffer place interface;

subdividing the input net model with a preliminary cut to form two subnets, wherein the preliminary cut and the two subnets meet requirements that include the preliminary cut passes through a first set of buffer place interfaces, objects of each of the subnets other than the first set of buffer place interfaces are reachable from at least one initial marking, and the subnets do not include a mix of initial and non-initial marking places;

subdividing each of the two subnets that meet the requirements to form an additional two subnets;

unfolding each of the subnets formed by subdividing to form a plurality of unfolded subnets;

joining together each of the unfolded subnets from the plurality of unfolded subnets to form the unfolded output net; and storing the unfolded net in a storage unit of the processing system, wherein at least one of the subdividing the input net model, the subdividing the two subnets, the unfolding, and the joining is performed by the processing system.

19. The method of claim 18 wherein the unfolding comprises:

finding in a library database an unfolded subnet corresponding to at least one of the subnets formed by subdividing; and fetching the unfolded subnet found in the library database for use as one of the unfolded subnets to be joined.

20. The method of claim 19 further comprises:

running an unfolding algorithm to unfold each of the remaining subnets not found in the library database.

* * * * *